(12) United States Patent
Zvak

(10) Patent No.: US 11,606,988 B2
(45) Date of Patent: Mar. 21, 2023

(54) GLOVE WITH CLIP

(71) Applicant: Radim Zvak, Addison, IL (US)

(72) Inventor: Radim Zvak, Addison, IL (US)

(*) Notice: Subject to any disclaimer, the term of this patent is extended or adjusted under 35 U.S.C. 154(b) by 150 days.

(21) Appl. No.: 16/888,848

(22) Filed: Jun. 1, 2020

(65) Prior Publication Data
US 2020/0375288 A1 Dec. 3, 2020

Related U.S. Application Data

(60) Provisional application No. 62/855,189, filed on May 31, 2019.

(51) Int. Cl.
*A41D 19/00* (2006.01)
*F16B 2/24* (2006.01)

(52) U.S. Cl.
CPC ....... *A41D 19/0037* (2013.01); *A41D 19/002* (2013.01); *F16B 2/24* (2013.01); *A41D 2400/48* (2013.01); *A41D 2600/20* (2013.01)

(58) Field of Classification Search
CPC ............ A41D 19/0037; A41D 19/0034; A41D 19/002; A41D 19/0024; A41D 19/0027; A41D 19/0031; A41D 19/00; A41D 19/0051; A41D 19/01594; A41D 2400/48; A41D 2600/20; F16B 2/24; B42D 5/006; B42D 5/005; B42D 5/007; Y10T 24/1394; G09F 1/10; G09F 2001/106; G09F 3/005; G09F 3/16; G09F 21/023; G09F 21/026; A45F 5/02; A45F 5/022; A45F 2005/023; B42F 9/002; B42F 23/00
USPC .......... 2/158, 159, 160, 17, 20; 24/3.2, 3.12; 281/44; 40/586, 661.04, 639, 658, 647, 40/659, 660, 661.01
See application file for complete search history.

(56) References Cited

U.S. PATENT DOCUMENTS

| | | | | |
|---|---|---|---|---|
| 61,428 A * | 1/1867 | Hindman | ................ | A47J 17/02 30/123.5 |
| 633,220 A * | 9/1899 | Sholl | ....................... | A47J 17/02 30/123.5 |
| 758,196 A * | 4/1904 | Thomas | .................. | A47J 17/02 30/123.5 |
| 825,510 A * | 7/1906 | Bloc | .................... | A41D 19/002 2/160 |
| 851,278 A * | 4/1907 | Dean | ........................ | A41B 3/06 2/134 |
| 986,158 A * | 3/1911 | Florsheim | ................ | A45C 1/02 453/50 |
| 1,402,346 A * | 1/1922 | Fogg | .................. | A41D 19/0024 2/160 |

(Continued)

FOREIGN PATENT DOCUMENTS

GB 190111914 A * 7/1901
JP 2007139175 A * 6/2007

*Primary Examiner* — Amy Vanatta
(74) *Attorney, Agent, or Firm* — Applied Patent Services, PC; James D Palmatier

(57) ABSTRACT

The glove with clip is a clip on the outside of the back of a glove having a spring loaded raised lip urged against the glove or a spring base on the glove to removably hold papers, notes, instructions or lightweight material such as sand paper. The clip may be a flat metal clip having a spring base on the glove, a spring wire attached to the glove or a magnetic closure adapted to releasably hold papers or similar material used by a worker such as a plumber or electrician.

7 Claims, 2 Drawing Sheets

(56) References Cited

U.S. PATENT DOCUMENTS

| | | | | | |
|---|---|---|---|---|---|
| 1,419,190 | A | * | 6/1922 | Zipoy | B42D 5/006 |
| | | | | | 224/267 |
| 2,675,798 | A | * | 4/1954 | Rosmarin | A41D 19/01535 |
| | | | | | 126/204 |
| 2,717,546 | A | * | 9/1955 | Ryden | A41D 19/01547 |
| | | | | | 172/370 |
| 2,877,465 | A | * | 3/1959 | Stroud | A63B 71/146 |
| | | | | | 2/161.2 |
| 4,906,025 | A | * | 3/1990 | Schreindl | B42D 5/006 |
| | | | | | 224/267 |
| 5,110,154 | A | * | 5/1992 | Street | A41D 19/0037 |
| | | | | | 280/822 |
| 5,143,371 | A | * | 9/1992 | Strahan | A63B 57/00 |
| | | | | | 473/285 |
| 5,887,839 | A | * | 3/1999 | Smith | B42F 9/002 |
| | | | | | 2/160 |
| 2005/0268372 | A1 | * | 12/2005 | DeMarco | A41D 19/01552 |
| | | | | | 2/160 |
| 2014/0374451 | A1 | * | 12/2014 | Coleman | H04M 1/04 |
| | | | | | 224/219 |
| 2017/0361184 | A1 | * | 12/2017 | Roy | A41D 19/0024 |

* cited by examiner

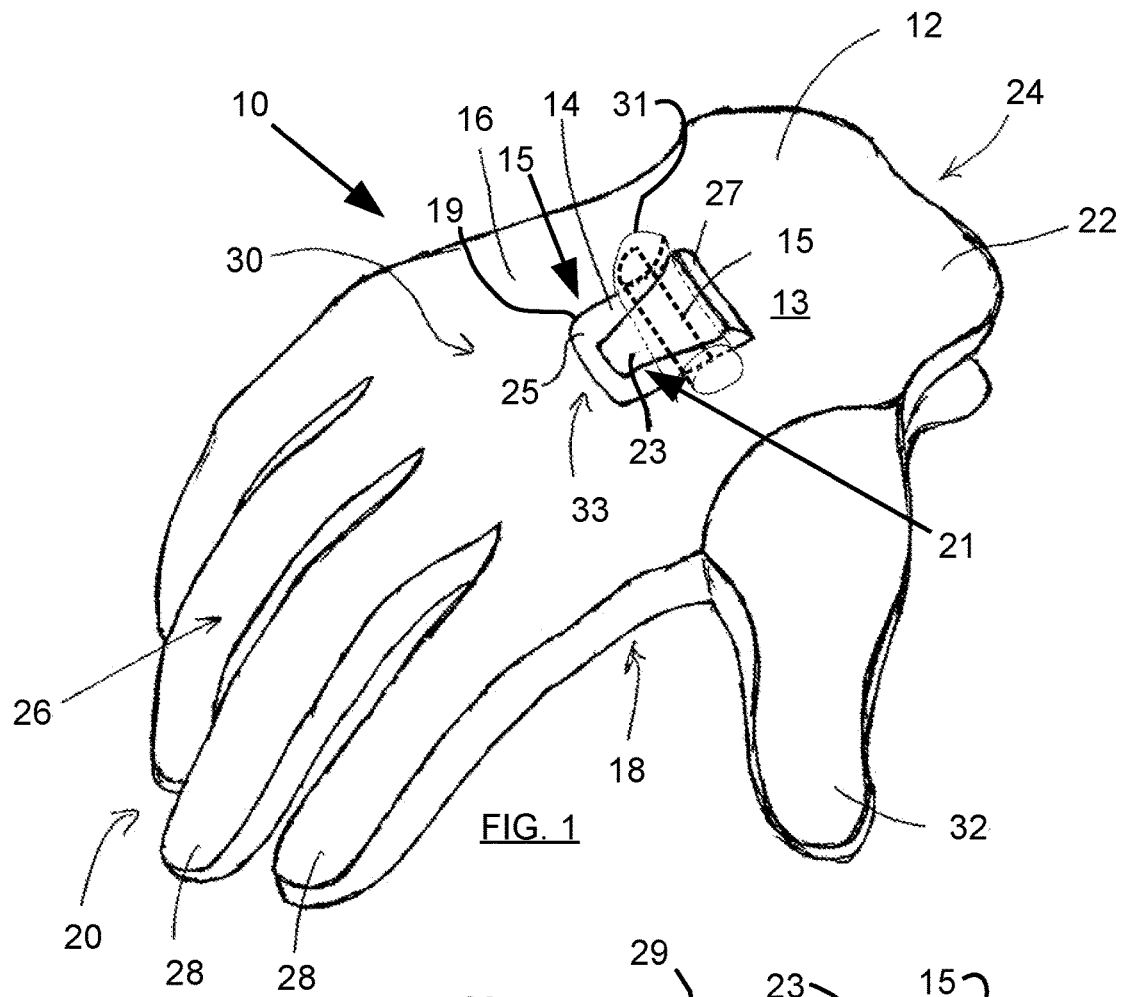
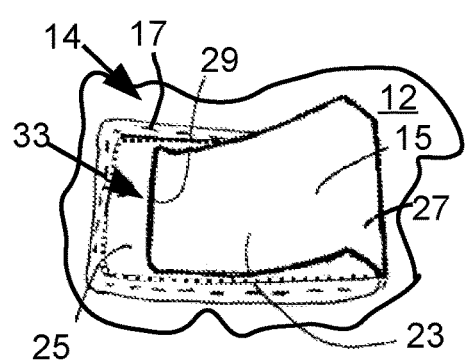
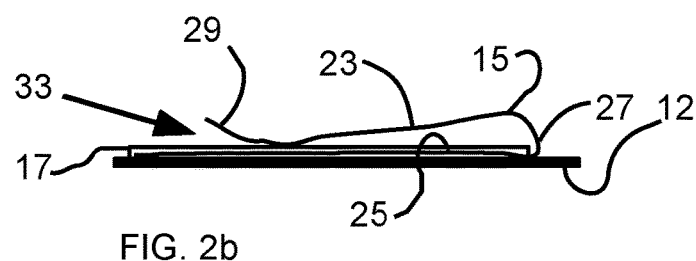
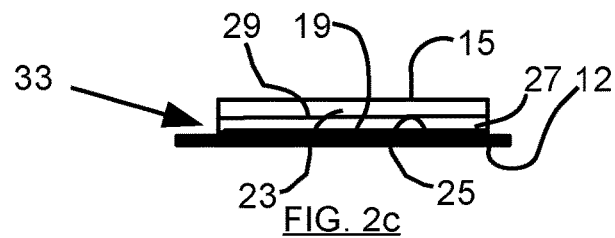
FIG. 1
FIG. 2a
FIG. 2b
FIG. 2c

GLOVE WITH CLIP

FIELD OF THE INVENTION

The present invention relates generally to work gloves, and more particularly, to an apparatus for securely lightweight items to a work glove.

DESCRIPTION OF RELATED ART

Gloves are used to protect hands from weather, chemicals and abrasive objects. Gloves may be made of man made or natural materials. Gloves may interfere with accessing objects in pockets. The Glove with clip relates to gloves used by workers, primarily trade workers such as plumbers, painters, brick layers, roofers, and others that may have to work in situations where documentation, instructions or lightweight work materials need to be accessed with minimal effort. Workers may be on ladders or in areas where they do not have easy access to documents such as wiring diagrams, schematics or plumbing connections. These workers may have both their hands full with necessary tools or hanging on to a secure fixture. During the course of their work, the workers may need to refer to these instructions or may need to make notes for later inclusion in as-built drawings. The Glove with clip may also be used to hold lightweight objects such as instruction or work materials such as sand-screen or sand paper necessary in the performance of their duties. The Glove with Clip provides an easy to access storage location on the glove to reduce the need to step away from their immediate tasks or climb down a ladder to review such reference instructions, grab the sand paper or make a quick note without taking their view away from the work.

Accordingly, there is a need for an apparatus to enable workers to have papers and materials readily available without having to dig in a pocket or step away from the work.

BRIEF DESCRIPTION OF THE PRESENT INVENTION

One aspect of the present invention is to provide a glove having an apparatus for connecting documents and lightweight objects to the top of the glove that also can be easily removed and reattached.

The Glove with Clip provides a glove having a clip secured to the top or back of the glove. The clip may be secured to the top of the glove by adhesive or stitching. Additionally, the clip preferably is constructed as a resilient unitary member out of a polymer or a metal material. An opening of the clip may be disposed adjacent to the fingers or front of the glove.

The above description sets forth, rather broadly, the more important features of the present invention so that the detailed description of the preferred embodiment that follows may be better understood and contributions of the present invention to the art may be better appreciated. There are, of course, additional features of the invention that will be described below and will form the subject matter of claims. In this respect, before explaining at least one preferred embodiment of the invention in detail, it is to be understood that the invention is not limited in its application to the details of the construction and to the arrangement of the components set forth in the following description or as illustrated in the drawings. The invention is capable of other embodiments and of being practiced and carried out in various ways. Also, it is to be understood that the phraseology and terminology employed herein are for the purpose of description and should not be regarded as limiting.

BRIEF DESCRIPTION OF THE DRAWINGS

FIG. 1 is a perspective view of a glove configured in accordance with the present invention;

FIG. 2a is a perspective view of clip shown in FIG. 1;

FIG. 2b. is a side view of the clip shown in FIGS. 1 and 2a;

FIG. 2c is a front view of the clip shown in FIGS. 1, 2a, and 2b;

DETAILED DESCRIPTION OF THE PREFERRED EMBODIMENT

Figure 3:
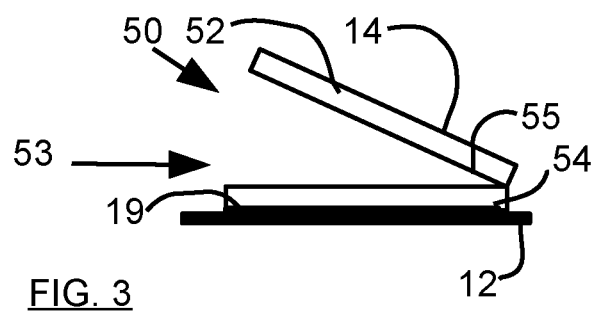
FIG. 3 is a side view of a retaining element configured in accordance with a second embodiment of the present invention.

Referring now to the drawings, FIG. 1 is a perspective view of the Glove with Clip configured in accordance with the present invention. The apparatus 10 includes a glove 12 having a connector 14, a palm portion 16, a top 13, a thumb portion 18, a front portion 20, and a rear portion 22. The palm portion 16 between the front portion 20 and the rear portion 22. The connector 14 may be on the palm portion 16. The glove 12 may be adapted to receive a hand (not shown). The front portion 20 of the glove 12 includes a finger area 26. Finger area 26 may include a plurality of individual fingers 28. The plurality of individual fingers 28 provide locations for inserting individual fingers of a person's hand (not shown).

The connector 14 may be disposed on the palm portion 16 between the front portion 20 and the rear portion 22. A thumb 32 may be attached to the palm portion 16 between the front portion 20 and the rear portion 22. The thumb 32 spaced from the connector 14. The glove 12 preferably is constructed of durable and flexible material, such as thick cloth, but also can be constructed of leather, rubber, plastic or other suitable material for a durable and flexible glove 12.

Continuing to refer to FIG. 1, the connector 14 may be adapted for releasably securing lightweight items such as paper notes 31 to the glove 12. The connector may be attached to the palm portion 16 of the glove 12. The connector 14 may comprise a fixed portion 15 on the glove 12 and a movable portion 21 adapted to bear against the fixed portion 15 whereby a lightweight item 31 may be disposed between the fixed portion 15 and the movable portion 21 for removable retention and easy access. In the preferred embodiment, the connector 14 is a clip 15 of unitary construction of a flexible, resilient material, such as metal or plastic. The clip 15 may comprise a base 25, a spring portion 27 and a movable lip 23. Base 25 may be attached to glove 12 by stitching 19, adhesive 19 or inserting base 25 in a stitched pocket 17. The base 25 on the top 13 of the glove 12. Spring portion 27 may be attached to base 25 and lip 23. Lip 23 may have a flat body and a raised end 29. Raised end 29 may be spaced from spring portion 27. Raised end 29 may be adjacent finger area 26. Spring portion 27 may be adapted to urge raised end 28 to bear against base 25. Lightweight material such as paper notes 31 may be disposed between lip 23 and base 25. The opening 33 faces the front 20 in the preferred embodiment and may face the thumb 32, back 24 or opposing thumb 32.

Referring to FIGS. 2a, 2b and 2c, clip 15 may further comprise opening 33 between base 25 and raised end 29. Pocket 17 may retain base 25 to glove 12. Pocket 17 may be stitched or glued onto glove 12. Base 25 is disposed generally parallel to glove 12. Spring portion 27 may be attached to base 25. Spring portion 27 may extend from glove 12 at a generally oblique angle. Spring portion 27 may further be attached to lip 23 thereby holding lip 23 in spaced relation to base 25. Spring portion 27 may be adapted to bear on lip 23 to urge raised end 29 to bear against base 25 forming open end 33 of clip 15. Open end 33 may be disposed adjacent glove 12 to enable lightweight objects 31, such as paper, to be easily inserted and removably retained. The clip 15 has a lip 23 connected to the base 25 by spring portion 27. The spring portion 27 flexibly connects the lip 23 to the base 25. Papers and other items can be inserted into the opening or receiving end 33 of the clip 15, thus causing the lip 23 to be raised away from the base 25, and the spring portion 27 provides constant pressure on the lip 23 urging the raised end 29 to bear against the base 25. The clip 15 can be secured to the glove 12 by use of an adhesive 19 or stitching on the base 25.

Referring to FIG. 3 a second embodiment of connector 14 configured in accordance with the present invention. The second embodiment of connector 14 of the present invention includes a multi-piece magnet 50. In a preferred configuration, the multi-piece magnet 50 include to plates 52 and 54 that are magnetically attracted to each other. Preferably both plates 52 and 54 are magnetic, but only one plate 52 may be magnetic and magnetically attracted to the opposing plate 54 made of steel or a similar magnetically attracted material. Magnetically attracted plates 52, 54 may may retain lightweight items placed in opening 53 between the plates 52 and 54. Magnetic forces in the space 55 extend between the plates 52 and 54 to removably retain the lightweight items. The glove plate 54 may be connected to the glove 12 in a similar manner to connecting clip base 25 to glove 12 by an adhesive 19 or stitching.

Figure 4:
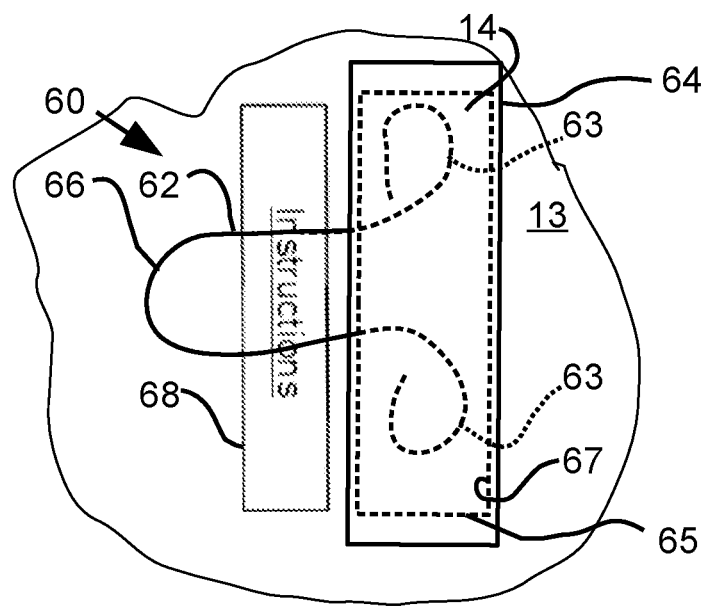
FIG. 4 is a top view of a clip configured in accordance with a third embodiment of the present of the present invention.

FIG. 4 illustrates a third embodiment of the connector 14 of the present invention wherein the connector 14 includes a resilient wire clip 60. The clip 60 may comprise a spring portion 62 formed of wire or resilient plastic rod, an anchor portion 63, a pocket 64, a fixation portion 65, and an extended, exposed lip end 66. Anchor portion 63 may be attached to glove 12 by fixation portion 65 in pocket 64. Pocket 64 is attached to glove 12 by adhesive or stitching 67. Exposed lip end 66 extends from pocket 64 and bears against glove 12 for holding papers 68 or the like against the glove 12. The anchor portion or opposing end 63 of the spring wire 62 is secured to the glove 12 by a cloth or other material pocket 64 that is glued or secured by stitching 65 to the glove 12.

While specific embodiments have been shown and described to point out fundamental and novel features of the invention as applied to the preferred embodiments, it will be understood that various omissions and substitutions and changes of the form and details of the invention illustrated and in the operation may be done by those skilled in the art, without departing from the spirit of the invention.

I claim:

1. A glove with a clip, the glove comprising a glove top, a finger portion and a palm portion, the clip comprising:
   a base, the base on the glove top, the base attached to the glove by stitching;
   a spring portion, the spring portion on the base, the spring portion extending away from the glove; and
   a lip, the lip on the spring portion, the lip extending from the spring portion toward the finger portion, the lip comprising a raised end, the raised end spaced from the base, the raised end spaced from the spring portion, wherein the spring portion bears against the lip to urge the raised end to bear against the base;
   a paper note on the glove top, the paper note in the clip between the base and the lip.

2. The glove with clip of claim 1, wherein the stitching extends through the base.

3. The glove with clip of claim 1, further comprising a pocket, the pocket on the glove top, the stitching in the pocket, the base in the pocket.

4. The glove with clip of claim 1, wherein the clip is formed of metal.

5. The glove with clip of claim 1, wherein the clip is formed of wire.

6. The glove with clip of claim 1, wherein the lip further comprises a magnet, the base further comprises a plate magnetically attracted to the lip.

7. The glove with clip of claim 1, further comprising a clip opening between the raised end and the base.

* * * * *